United States Patent [19]

Benkwitz

[11] Patent Number: 4,632,655

[45] Date of Patent: Dec. 30, 1986

[54] EMBOSSING CALENDER FOR THERMOPLASTICS FILMS

[75] Inventor: Helmut Benkwitz, Lehrte, Fed. Rep. of Germany

[73] Assignee: Hermann Berstorff Maschinenbau GmbH, Hannover, Fed. Rep. of Germany

[21] Appl. No.: 742,395

[22] Filed: Jun. 7, 1985

[30] Foreign Application Priority Data

Jun. 14, 1984 [DE]  Fed. Rep. of Germany ....... 3422091

[51] Int. Cl.[4] .................. B29C 43/24; B29C 43/46
[52] U.S. Cl. .............................. 425/186; 29/121.5; 72/238; 72/239; 100/162 R; 100/168; 425/194; 425/367
[58] Field of Search ............... 72/238, 239; 425/363, 425/367, 182, 183, 186, 194, 193; 100/160, 162 R, 168, 161, 163 R, 163 A; 29/121.5

[56] References Cited

U.S. PATENT DOCUMENTS

| | | | |
|---|---|---|---|
| 697,217 | 4/1902 | Pearce | 425/385 |
| 1,753,393 | 4/1930 | Van Houten | 425/194 |
| 2,815,531 | 12/1957 | Stewart | 425/194 |
| 3,246,365 | 4/1966 | Kloender | 425/385 |
| 3,547,776 | 12/1970 | Curtis | 100/160 |
| 4,131,063 | 12/1978 | Joutsjoki | 100/162 R |
| 4,211,165 | 7/1980 | Schill | 100/168 |

FOREIGN PATENT DOCUMENTS 3210325 11/1982 Fed. Rep. of Germany ........ 72/239

Primary Examiner—Willard E. Hoag
Attorney, Agent, or Firm—Schwartz, Jeffery, Schwaab, Mack, Blumenthal & Evans

[57] ABSTRACT

An embossing calender for thermoplastics films in which the film is embossed by passage between an embossing roller and a counter-roller and in which the rollers can be rapidly changed or replaced. This is achieved by providing separate support arrangements for the two rollers, which arrangements permit the respective rollers to be displaced into and out of their working positions. The support arrangement for the embossing roller comprises a support member along which at least one holder for the roller is displaceable between a working position and at least one further inoperative position. This permits the selective positioning of each holder and its associated roller.

The arrangement for the counter-roller comprises a support which has a pivotally mounted displacement device associated therewith. The displacement device includes holders. The pivotal movement of the displacement device permits the holders to move into and out of contact with the counter-roller so as to move it into and out of its operative position. This permits an appropriately selected counter-roller to be located in the operative position.

4 Claims, 2 Drawing Figures

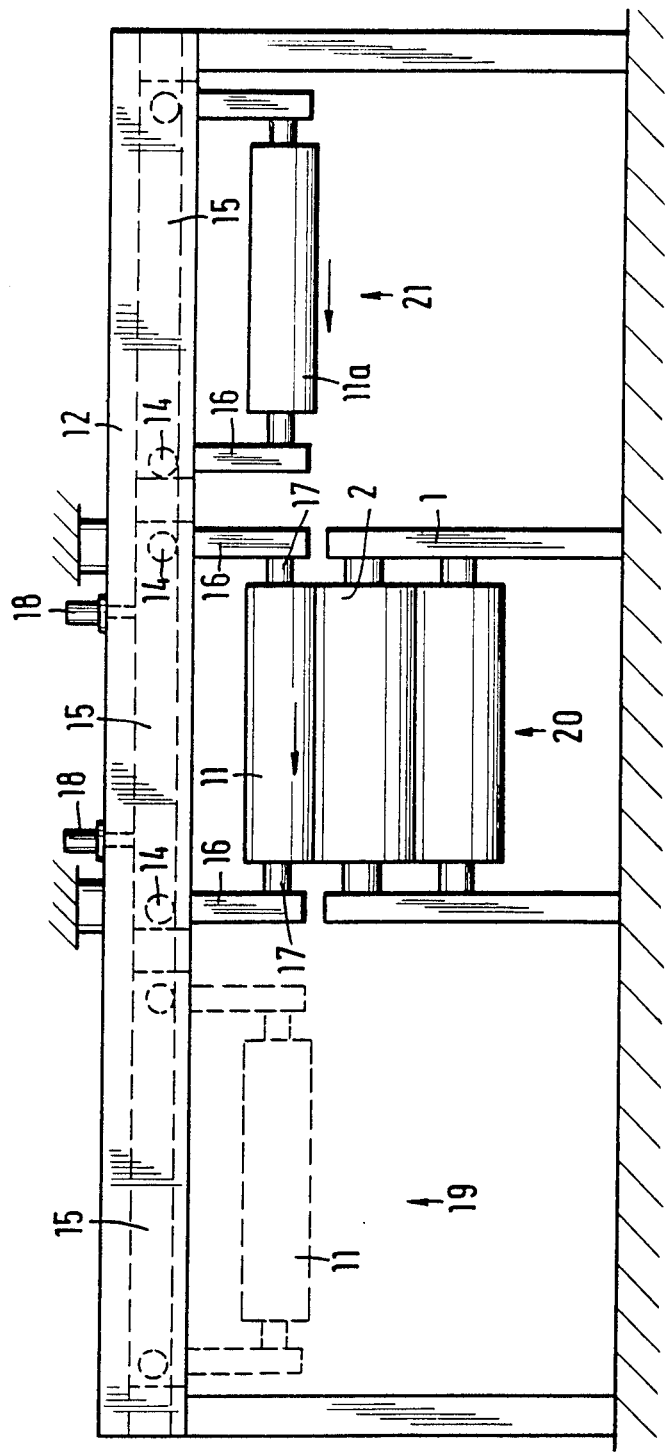

EMBOSSING CALENDER FOR THERMOPLASTICS FILMS

FIELD OF THE INVENTION

The present invention relates to an embossing calender for thermoplastics films. More particularly, the present invention relates to an embossing calender of the type which comprises an embossing roller and a counter-roller.

BACKGROUND OF THE INVENTION AND PRIOR ART DISCUSSION

In German Patent Specification No. 2 338 446, there is disclosed an embossing calender for thermoplastics films. Such calender comprises an embossing roller having a relatively small diameter and a counter-roller which has a larger diameter and is covered with a resilient coating. The embossing roller and counter-roller are mounted in a support column which is not shown in the drawings accompanying this prior document.

The embossing rollers used for embossing thermoplastics films or similar materials need to be interchanged at frequent intervals so that, for example, the pattern being embossed can be altered. Similarly the counter-rollers, which are covered with a resilient coating, also need to be interchanged at frequent intervals. In practice, the counter-roller is interchanged approximately five times less frequently than the embossing roller.

The procedure involved in changing the embossing roller and the counter-roller disclosed in the above-identified prior art causes the entire calendering production line being out of operation for a lengthy period of time, since such line generally comprises a processing extruder for the thermoplastics material, the means for feeding the material into a calender, the calender itself, a subsequent stretching and cooling section, an embossing calender and a winding station, such a lengthy period of inactivity is obviously economically undesirable.

OBJECT OF THE INVENTION

The present invention seeks to provide an apparatus by means of which the interchanging of the embossing roller and of the counter-roller can be effected much more rapidly than in the prior art arrangement and, in consequence, to ensure that the calendering line is out of operation for as short a time as possible when one or both of the rollers are changed. In particular, the invention seeks to provide an apparatus in which both the embossing roller and the counter-roller can be changed substantially simultaneously with one another but independently of one another.

SUMMARY OF THE INVENTION

According to the present invention, there is provided an embossing calender for thermoplastics films in which the film is embosed by passage between an embossing roller in a working position and a counter-roller in a working position, comprising a support means having at least one holding device displaceably mounted thereon, each holding device being capable of carrying an embossing roller and being displaceable between a first position in which an embossing roller carried thereby is located in the working position and at least one further position in which said roller is located in an inoperative position so as to permit the selective positioning of each said holder and embossing roller carried thereby, and a support device for retaining the counter-roller in its working position, the support device having a pivotally mounted counter-roller displacement device associated therewith, the displacement device including counter-roller holding lmeans, the pivotal movement of the displacement device being such as to permit the holding means to move into and out of contact with the counter-roller so as to move said counter-roller into and out of its operative position, thereby permitting the positioning of an appropriately selected counter-roller in the operative position.

By providing an embossing calender in accordance with the present invention, both the embossing roller and the counter-roller can be interchanged either substantially simultaneously with one another or separately. If only one of the rollers is interchanged at any one particular time, this can be effected without affecting the other roller. There is produced a considerable saving in the time required for the interchange procedure and, hence, a considerable shortening of lost production time. In the past, it has only been possible to change the embossing roller and the counter-roller sequentially. This necessitated extensive assembly and disassembly work, especially with regard to the mountings for the rollers.

A considerable reduction in the time required for the interchange procedure can thus be achieved if it is made possible, as in the present invention, for the two rollers to be interchanged simultaneously.

In an advantageous embodiment of the invention, the support means for the displaceable holding devices is disposed axially parallel to and above the working position of the embossing roller, the frame protruding beyond the working position at each end by an amount corresponding to at least the length of an embossing roller located in the working position, each holding device having wheels mounted thereon, which wheels are guidably displaceable on rails formed in the lower portion of the support means, the rails extending over substantially the entire length of the support means, each embossing roller having bearings engageable by the holding device and being lockable in position.

Using such an arrangement, it is possible to prepare a replacement embossing roller at one end of the support means, that is to say, in an inoperative position. The old roller, that is to say, the roller to be replaced, can then be displaced into an inoperative position along the guide rails. Subsequently, the replacement embossing roller is displaced into the vacated working position and locked in place. Such an interchange procedure takes only a few minutes and may additionally be carried out simultaneously with the interchange procedure for the counter-roller.

Desirably, the pivotally-mounted displacement device is in the form of a cranked lever and is pivotable about a pivot bearing disposed at the free end of one of the arms of the lever, the free end of the other arm of the pivotal lever is provided with bifurcated holders which engage with the bearings of the counter-roller.

Advantageously, a lifting mechanism is provided which engages substantially in the central region of the arm of the lever having the pivot bearing disposed thereon so as to permit the other arm of the lever, together with the counter-roller to pivot into the region of the working position of the counter-roller. However, the pivotal movement of the displacement device may also be actuated by other means such as any other suitable type of lifting apparatus.

The interchange procedure for the counter-roller commences when the working roller is pivoted out of its working position into its interchange position. In its interchange position, the roller can easily be grasped by a fork-lift truck and replaced by a new roller.

If, in addition, a lifting mechanism is provided which is actuable by means of hydraulic piston and cylinder arrangements, the interchange procedure for the counter-roller can be performed even more rapidly. This is because the counter-roller can then be extracted from the interchange position even more rapidly.

BRIEF DESCRIPTION OF THE DRAWINGS

One embodiment of an embossing calendering device in accordance with the present invention will be further described, by way of example, with reference to the accompanying drawings, in which:

FIG. 2 is a front elevational view of the device shown in FIG. 1.

DESCRIPTION OF PREFERRED EMBODIMENTS

Figure 1:
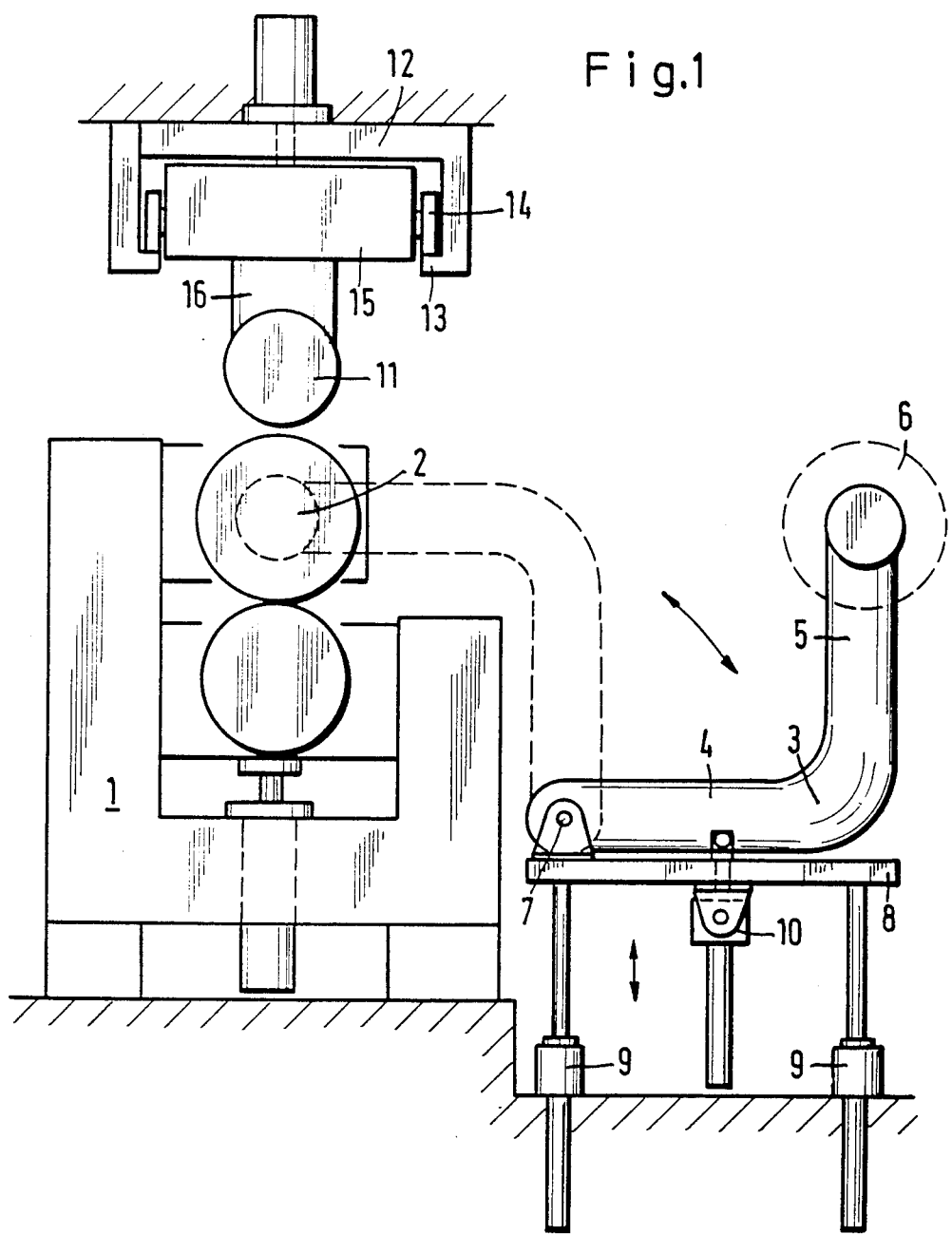
FIG. 1 is a diagrammatic side elevational view of an embossing calendering device in accordance with the present invention.

As shown in the drawings, an embossing calendering device in accordance with the present invention comprises an embossing roller 11 and a counter-roller 2. The counter-roller 2 is mounted on a support column 1.

A pivotal frame 3 in the form of a cranked arm is provided for interchanging the counter-roller 2. The frame 3 comprises a lower arm portion 4 and an upper arm portion 5. The frame 3 is shown in its normal position in full lines and in the position which it occupies when the counter-roller 2 is being interchanged in broken lines.

The arm 4 is mounted in a pivot bearing 7, which bearing is disposed on a lift platform 8. The lift platform 8 is made vertically adjustable by means of the lifting mechanism 9.

In use, the pivotal frame 3 is pivoted from its normal position into its interchange position by means of a further lifting mechanism 10. On the end of the arm 5, two bifurcated holders (not shown) are provided at the end of such pivotal movement, the holders engage the bearings for the counter-roller 2. The lifting mechanism 10 is then reversed and the frame 3 pivoted back into into normal position. The roller 2 is thus removed from the calendering device. In the normal position of the frame, the roller 2 is removed from the holders and a new counter-roller inserted therein. The frame is then pivoted for a second time into its interchange position so that the new roller is caused to occupy the position previously occupied by the original counter-roller 2. The frame 3 is then pivoted back into its normal position.

The manner in which the embossing roller 11 is interchanged is shown more clearly in FIG. 2. The roller 11 is provided with bearings 17 which are engaged by holders 16 mounted on the underside of a crosspiece member 15. The crosspiece member 15 is provided with wheels 14 which are displaceably guided on rails 13. The rails 13 are provided at the lower end of a receiving frame 12.

More than one set of holders 16 are provided on the crosspiece member 15 and a replacement embossing roller 11a is retained in one of the additional sets of holders 16 in a stand-by position 21. The original embossing roller 11 is retained in its position of use 20 by means of locking members 18, such as pneumatically operated piston and cylinder arrangements. To replace the roller 11 by the roller 11a, it is first necessary to nullify the effect of the locking members 18 holding the roller 11 in position. The roller 11 is then caused to travel by moving the crosspiece member 15 on its wheels 14 along the rails 13 from the working position 20 into a removal position 19.

The new embossing roller 11a is simultaneously moved into the vacated working position 20 from its standby position 21. It is then retained in the working position 20 by means of the locking members 18.

The procedure for interchanging either or both the embossing roller and the counter-roller thus only takes a few minutes to achieve and is simple to effect.

I claim:

1. An embossing calender for thermoplastics films comprising a support structure having upper and lower regions, at least one holder means diplaceably mounted on said support structure, embossing roller means detachably and rotatably mounted on each said holder means, said support structure defining a working position for a selected one of said holder means and said embossing roller means mounted thereon, means for locking said selected one of said holder means in said working position on said support structure, said holder means being disposed above said selected embossing roller means in said working position, said support structure further including guide rail means disposed in said lower region of said structure, said guide rail means extending substantially parallel to the axis of rotation of said embossing roller means and projecting beyond each of said embossing roller means in said working position by a distance corresponding at least to the axial length of said embossing roller means, said guide rail means defining a displacement path for said at least one holder means, wheel means mounted on each said holder means and engageable on said guide rail means, and bearing means rotatably mounting each said embossing roller in each said holder; rotatable counter-roller means disposed adjacent said embossing roller in said working position and defining, with said embossing roller, passage means for said film to be embossed, support means rotatably supporting said counter-roller, said support means defining a working position for said counter-roller adjacent said embossing roller, pivotal counter-roller displacement means associated with said support means, and holder members formed on said displacement means whereby pivotal movement of said displacement means causes said holder members to move selectively into and out of engagement with said counter-roller to move said counter-roller selectively into and out of said working position.

2. An embossing calender for thermoplastics films comprising a support structure, at least one holder means displaceably mounted on said support structure, embossing roller means detachably and rotatably mounted on each said holder means, said support structure defining a working position for a selected one of said holder means and said embossing roller means mounted thereon, means for locking said selected one of said holder means in said working position on said support structure, rotatable counter-roller means disposed adjacent said embossing roller in said working position and defining, with said embossing roller, passage means for said film to be embossed, support means rotatably supporting said counter-roller, said support means defining a working position for said counter-roller adjacent said embossing roller, pivotal counter-roller displacement means associated with said support means, and holder members formed on said displacement means, said pivotal counter-roller displacement means comprising a cranked lever, said lever having first and second free end regions, a pivot bearing connected to said first end region of said cranked lever and said holder members being disposed at said second end region, said holder members comprising bifurcated members, said calender further including bearing members rotatably mounting said counter-roller, said bifurcated members engaging with said bearings in one pivotal position of said cranked lever, whereby pivotal movement of said cranked lever causes said holder members to move selectively into and out of engagement with said counter-roller to move said counter-roller selectively into and out of said working position.

3. An embossing calender as recited in claim 2, additionally comprising lifting means engaging said cranked lever substantially centrally between said pivot bearing and the angle of said cranked lever.

4. An embossing calender as recited in claim 2, additionally comprising lifting platform means supporting said pivot bearing, and lifting means acting on said platform means to raise and lower said platform means.

* * * * *